May 20, 1958   R. C. GORDON ET AL   2,835,206
ARTICLE SORTING DEVICE
Filed Oct. 27, 1955   3 Sheets-Sheet 1
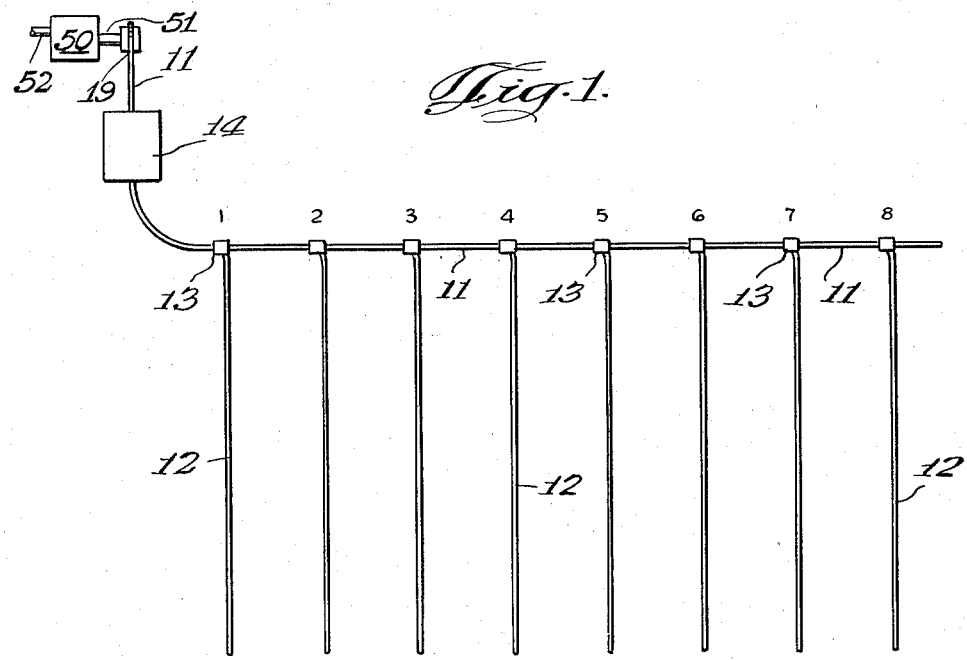
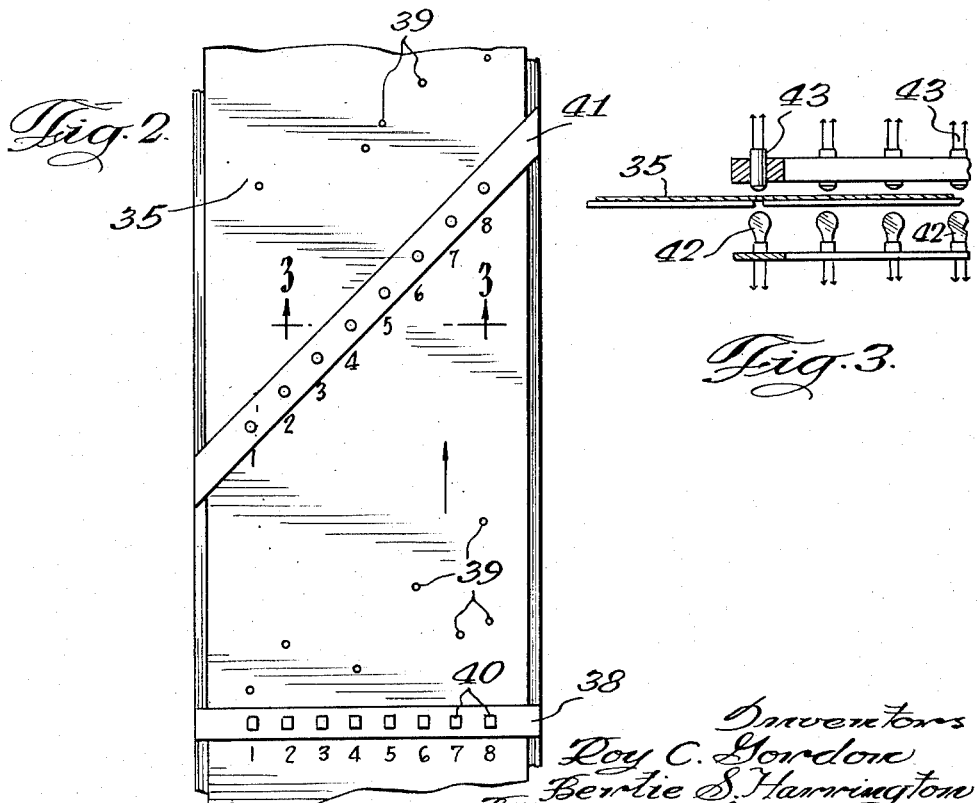

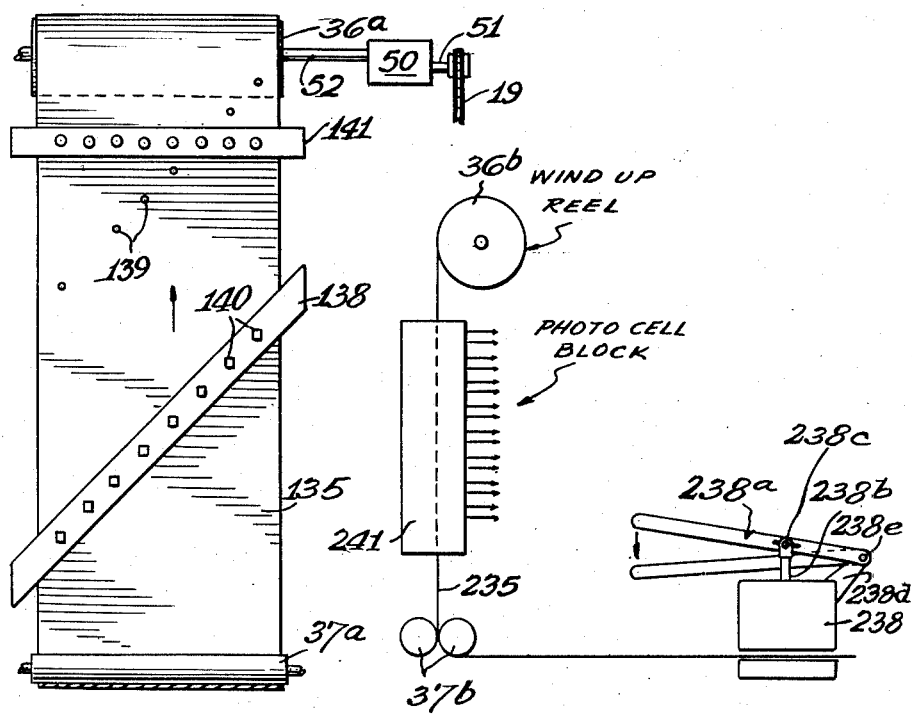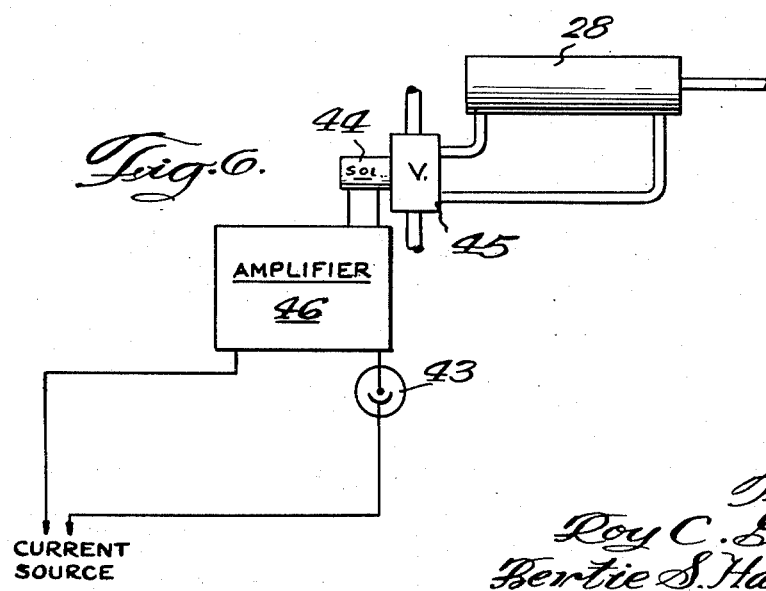

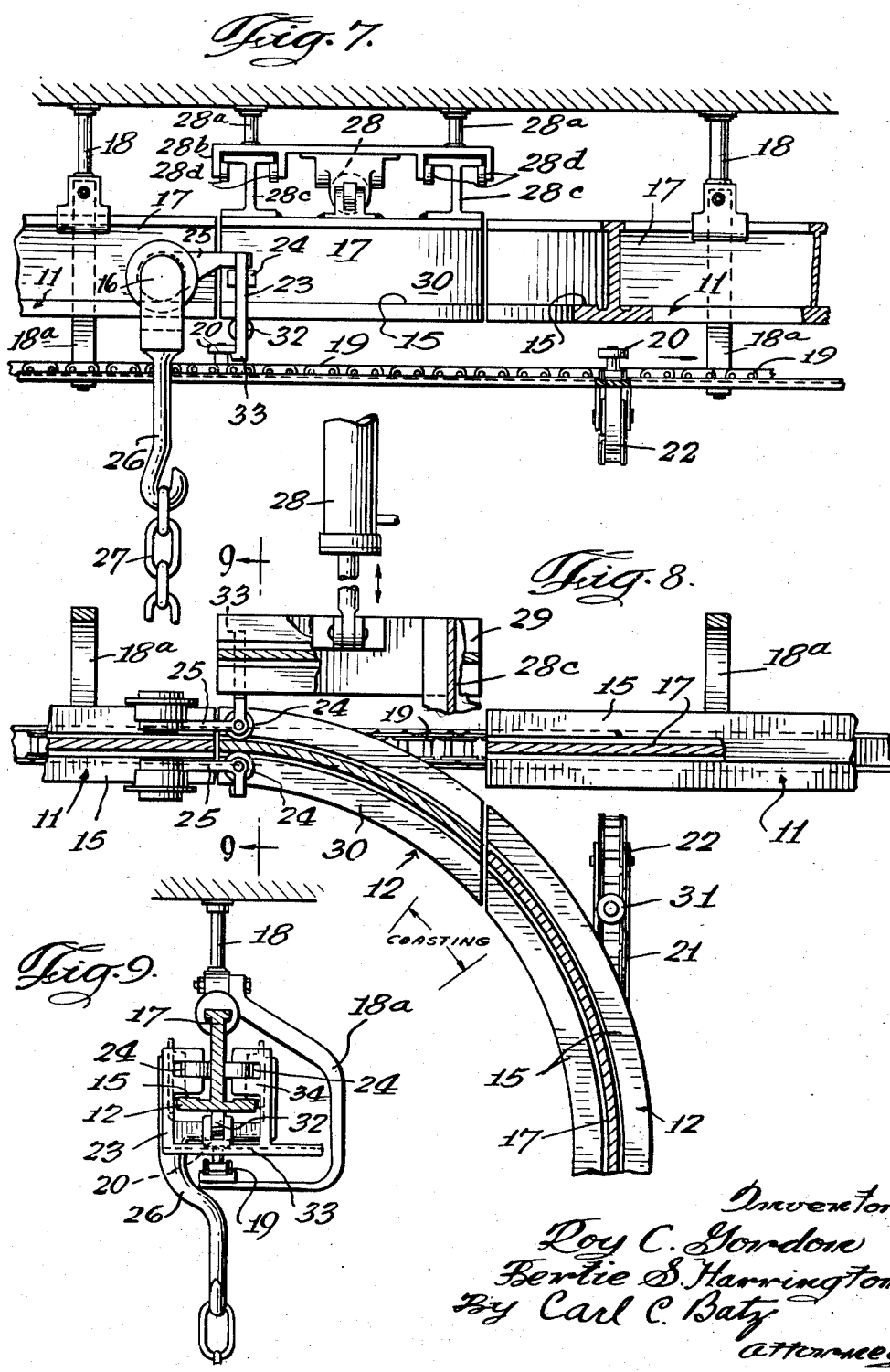

United States Patent Office 2,835,206
Patented May 20, 1958

2,835,206

ARTICLE SORTING DEVICE

Roy C. Gordon, Oak Lawn, and Bertie S. Harrington, Chicago, Ill., assignors to Armour and Company, Chicago, Ill., a corporation of Illinois Application October 27, 1955, Serial No. 543,222

3 Claims. (Cl. 104—88)

This invention relates to an article sorting device, and more particularly to apparatus for sorting animal carcasses conveyed on an overhead track in an abbatoir operation.

The prevailing practice in slaughterhouse operations generally involves individually suspending animal carcasses from an overhead track by attaching a shackle to one of the hind legs of the carcass and mounting such shackle on a trolley releasably conveyed on the overhead track; whereupon the animal carcasses can be manipulated through the various steps of the slaughtering procedure. For example, in the slaughtering of cattle, after dispatching the animal, the head is severed from the body portion and the hide stripped from the carcass. Thereafter, the carcass is eviscerated and split into two halves which are termed "sides." Usually these sides are encased in shrouds and refrigerated to preserve the meat during subsequent storage and transportation. These sides of beef are classified according to weight and grade during storage in a cooler, and the classified sides are transported to distributing points for sale to the butcher and ultimately to the consumer.

In the conventional refrigeration process the carcasses are manually transported to a "hot" cooler and maintained under refrigeration until the carcass temperature has been reduced to a point at which decomposition of the meat has been inhibited. The chilled carcasses are then transported to a "cold" cooler where they can be stored pending transshipment. These carcasses are tagged according to classification, and the classified carcasses can be selected to fill a specific order. The selected carcasses must then be manually removed from the cooler and grouped for shipment. This procedure involves considerable manual labor and a great deal of time is lost in finding the proper carcasses for a given order and moving them to a collection point.

An object of this invention is the provision of a device for sorting articles in a manufacturing operation. Another object is the provision of apparatus for sorting animal carcasses according to a predetermined classification so that they may be mechanically conveyed to a collection point for transshipment. A further object is to provide apparatus for randomly sorting articles conveyed on an overhead track according to predetermined classification and transporting the sorted classes through a manufacturing operation. Other objects and advantages will become apparent as the specification proceeds.

One embodiment of this invention is shown in the accompanying drawings wherein: Fig. 1 is a schematic view of a carcass sorting apparatus; Fig. 2 is a top view of a special control element in the carcass sorting apparatus; Fig. 3 is a side view of this control element, partly in cross-section, taken along line 3—3 of Fig. 2; Fig. 4 is a top view of another embodiment of the control element; Fig. 5 is a side view of still another embodiment of the control element; Fig. 6 is a diagrammatic view of the electrical circuit involved in the carcass sorting device; Fig. 7 is a side view of a segment of the overhead track in the carcass sorting apparatus, partly in cross-section; Fig. 8 is a top view of the segment of the overhead track shown in Fig. 7; and Fig. 9 is an end view, partly in cross-section, taken along lines 9—9 of Fig. 8.

The particular embodiment of this invention shown in these drawings includes, principally (see Fig. 1), feed path 11 on which animal carcasses are conveyed from the slaughtering operation, discharge paths 12 displaced laterally from feed path 11, switches 13 for shunting the animal carcasses from feed path 11 to discharge paths 12, and control element 14 for actuating switching devices 13.

Feed path 11 and discharge paths 12 may be any overhead track system for conveying the animal carcasses at a substantially uniform velocity such as the article transport apparatus described in Harrington, B. S. and Gordon, R. C., U. S. patent application No. 490,388, filed February 24, 1955, in which one embodiment of the apparatus includes channel guides fixed in parallel relation to an overhead track, a T bar slidably engaged between said channel guides, a plurality of ratchets pivotally connected to the plane surface of the T bar being spring biased in a direction perpendicular to such T bar, carcass supports movably suspended from the overhead track, and means for reciprocally moving the T bar. In this apparatus the perpendicular edges of the ratchets engage the carcass supports and transport them on the overhead track.

The overhead track may be suspended from a ceiling or fastened to a wall by any bracket means. This carcass sorting apparatus can be adapted to existing overhead track facilities without the provision of additional supporting means for its installation does not substantially increase the stress or strain on such facilities.

The overhead track of the feed and discharge paths may include a T beam consisting of trolley rails 15 being supported and separated by vertical track web 17 (see Figs. 7 and 8). The T beam may be suspended from an overhead structure by supports 18 which are bolted to track web 17. Trolley rails 15 can be machined to provide parallel indentations or grooves into which trolleys 16 can be movably mounted. Trolley 16 consists of trolley wheels pivotally connected to hook 26 from which is suspended shackle chain 27 adapted to be releasably attached to the hind leg of an animal carcass (not shown). Trolleys 16 are also provided with guide wheels 24 which ride on the lateral surface of track web 17 and which are pivotally connected to the trolley wheels by horizontal supporting bars 25. Horizontal supporting bars 25 are also connected to vertical supporting bars 23 which support a laterally extending bar 33 on which is mounted centering wheel 32 riding on the nether surface of trolley rails 15. Lateral support bar 33 is also provided with a downwardly extending finger which engages stud 20 mounted on endless chain 19. Studs 20 can be mounted on endless chain 19 at uniformly spaced intervals. Endless chain 19 can be moved at a constant rate of speed by a motor (not shown) to convey the animal carcasses suspended on trolleys 16 from the overhead track at a uniformly spaced distance and a constant rate of speed. The endless chain can be mounted on brackets 18a which are connected to overhead support 18.

The carcasses can be shunted from feed path 11 to discharge paths 12 in this sorting apparatus by switches 13 situated at the junction of such paths (see Figs. 7, 8 and 9). These switches may include straight switch section 29 and curved switch section 30 mounted on I beams 28c. These I beams can be positioned perpendicularly to the overhead track and may be slidably engaged against the nether surface of switch carrier 28b, switch carrier 28b is provided with downwardly extending bars on which are pivotally connected roller bearings 28d riding on the under surface of the upper lateral projection of the I beams. Switches 13 may be suspended from an overhead structure by supports 28a mounted on switch supporting structure 28b to which is also connected hydraulic piston 28. This article sorting device may be adapted to any switching means for discharging articles from a feed path.

Hydraulic piston 28 is actuated by switch control element 14 to move straight switch section 29 in alignment with feed path 11 and displace curved switch section 30 from its position connecting feed path 11 with discharge path 12.

Special control element 14 actuates switches 13 to discharge carcasses from feed path 11 (see Figs. 2 and 3). This special control element includes marking devices 38, scanning device 41 and moving tape 35. This tape may be composed of paper, cloth, plastic, etc. As is illustrated in Figs. 4 and 5, the tape 35 can be unwound from a roll (not shown) and after passing between rollers 37, is wound up on reel 36. Rollers 37 exert pressure on moving tape 35 to provide constant alignment with the marking and scanning devices. The tape 35 is moved at a speed proportional to that of the carcasses being conveyed on feed path 11 relative to the comparative lengths of such tape and the overhead track. For example, when the distance between rollers 37 and scanning device 41 (see Fig. 4) is directly proportional to the distance between control element 14 and switch No. 8 (see Fig. 1), the relative speed of the tape and carcasses is of the same direct proportion. On the other hand, the tape and overhead track may be of any length, providing the carcasses and tape are moved at a speed proportional to the relative lengths of such tape and overhead track. As is illustrated in Figs. 1 and 4, the same motor (not shown) can be utilized in moving both the tape and carcasses by driving the axle or shaft 52 of windup reel 36a through a reduction gear 50 which is in turn connected to the drive shaft 51 of the endless chain 19, thus providing that chain 19 with the article supports attached thereto and the windup reel will always move at proportionate speeds.

In this control element, marking device 38 produces, on tape 35, marks which are responded to by scanning device 41 to actuates switches 13. For example, the mark produced on the tape may be a special electrical conducting medium, such as a graphite mark, which makes a contact between two wires engaging such tape (scanning device) to complete an electrical circuit and actuate switch 13. On the other hand, the three embodiments of the marking device shown in the drawings (Figs. 2, 4 and 5) produce perforations 39 in tape 35, each of which may be responded to by the scanning device to actuate switches 13. This marking device can be operated by such means as a remote control key or, as shown in Fig. 5, by a plurality of punching devices 40, each comprising manually operated lever 238a each being pivotally connected at 238e to a punch head 238b at 238c, each of said punching devices corresponding to one of the punches 40 of the marking device 38. In operating this embodiment of the marking device, lever 238a is depressed to force punch head 238b downwardly to obtain perforations 239 in tape 235.

Referring particularly to the basic illustrations of Figs. 1, 2 and 3, the marking device 38 may consist of a series of punches 40 such as are illustrated in Fig. 5, corresponding in number to the number of switches included in the sorting apparatus. Each of punches 40 in marking device 38 represents one of switches 13 in the sorting apparatus. In Figs. 1 and 2 are shown switches 13 numbered serially from 1 to 8 corresponding to punches 40 shown in Fig. 2, also numbered serially from 1 to 8.

In the following discussion specific reference is made to Figs. 2 and 3. This discussion is equally applicable to Figs. 4 and 5 in which different but corresponding numerals are used to indicate the various elements of the invention.

Scanning device 41 in this control element responds to marks on tape 35 to actuate switches 13 (see Figs. 2 to 5). This scanning device may be energized by such means as light, air, embossing and electrical conductance, but in the embodiment shown in the drawings it responds to light admitted through perforations 39 to energize a photoelectric cell and, in turn, to actuate the switches. This embodiment of the scanning device includes light sources 42 positioned subjacent to tape 35 and photoelectric cells 43 superimposed on such tape and responsive to light sources 42 when perforation 39 is opposite such light source (see Fig. 3). The number of photoelectric cells and light sources in scanning device 41 corresponds to the number of punches 40 in marking device 38 and the number of switches 13, and in Fig. 2 are numbered serially from 1 to 8. Instead of a photoelectric system as shown in the drawings, the energizing of scanning device 41 may be obtained by negative or positive air pressure maintained against tape 35 which upon encountering perforation 39 induces the energizing of a pressure-responsive means to actuate switches 13.

Marking device 38 should be positioned at an acute angle in relation to scanning device 41 in control element 14. The angle between such marking and scanning devices should be such that the distance between each of punches 40 and of photoelectric cells 43 is proportionate to the distance between control element 14 and the switch 13 corresponding in number to that of such marking and scanning devices. For example, the distance between punch number 1 and photoelectric cell number 1 should be proportionate to the distance between control element 14 and switch number 1, while the distance between punch number 6 and photoelectric cell number 6 should also be proportionate to the distance between control element 14 and switch number 6.

The energizing of photoelectric cell 43 by perforations 39 completes an electrical circuit whereupon solenoid 44 operates valve 45 to actuate hydraulic piston 28 to close switches 13 (see Fig. 6).

In operation, the animal carcasses may be transported from the slaughtering operation to the refrigeration area on an overhead track, and prior to entering such refrigeration area the carcasses can be classified according to grade and weight. For example, there may be 8 classifications or groups of animal carcasses requiring 8 discharge paths 12 laterally depending from feed path 11 to provide 8 selected groups of carcasses. In this operation control element 14 would include 8 of punches 40 in marking device 38 and 8 of photoelectric cells 43 in scanning device 41. When the animal carcasses pass a given point on feed path 11, a punch 40 corresponding in number to the classification of such carcass is operated to obtain a perforation 39 on moving tape 35. As the animal carcass moves past this point to discharge paths 12, the perforation thereupon made in tape 35 also is moved into contact with photoelectric cell 43 in scanning device 41 which corresponds in number to that of the punch in marking device 38. The contact between perforation 39 and marking device 38 effects the energizing of photoelectric cell 43 to actuate the switch corresponding in number to such photoelectric cell to produce a junction between feed path 11 and the particular discharge path 12 so that the animal carcass is shunted along such discharge path. For example, an animal carcass which is assigned to class 4 would be sorted by operating punch number 4, and the perforation 39 on tape 35 thereby produced would traverse the distance to photoelectric cell number 4 whereby switch number 4 would be actuated to shunt such carcass onto the corresponding discharge path 12. In the embodiment shown in Fig. 2 marking device 38 is positioned at a right angle to the edges of tape 35 and scanning device 41 is positioned diagonally across tape 35 to produce an acute angle with the marking device. The embodiment shown in Fig. 4 includes a scanning device 41 positioned at a right angle to the edges of tape 35 with marking device 38 being placed diagonally across tape 35 to produce an acute angle in relation to such marking device.

Although this sorting apparatus is especially adaptable to the classification of animal carcasses in a slaughtering operation, it may be used in connection with the sorting of any articles in a manufacturing procedure. Also, this sorting device can be utilized to divide, subdivide and resubdivide articles by positioning a control element at each of the discharge paths and thereby subsorting those groups of articles which have been conveyed onto such discharge path. Further, this apparatus can be utilized in preparing a continuous inventory of articles sorted in processing by employing a computer or counter in connection with this sorting device.

While in the foregoing specification various embodiments of this invention have been set forth and specific details therof elaborated for the purpose of illustration, it will be apparent to those skilled in the art that this invention is susceptible to other embodiments and that many of these details can be varied widely without departing from the basic concept and spirit of the invention.

We claim:

1. An apparatus for sorting articles comprising a system of paths, said system having a main feed path and a plurality of discharge paths; a plurality of switches each positioned in said main feed path at the junction of each discharge path; means for actuating each of said switches; article supports; first means for moving said article supports; a control tape; second means for moving said control tape at a speed proportionate to the speed of said first means; a plurality of marking means corresponding in number to the number of switches and arranged in lateral placement across said control tape, each corresponding to a particular switch; and a plurality of sensing means responsive to the markings on said tape, each operatively connected with the actuating means of a switch, said sensing means being positioned laterally across said control tape in angular relationship with said marking means such that the linear distance between the marking and sensing means for any particular switch is proportionate to the actual distance of that switch in the main feed line from the point of marking, said first and second moving means being synchronized such that a chosen article support reaches its selected switch in the main feed line at the time the mark on the control tape corresponding to the chosen article support reaches the sensing means corresponding to said selected switch.

2. An apparatus according to claim 1, wherein the marking means is a punch which perforates the control tape.

3. An apparatus according to claim 1, wherein the sensing means is a photo-electric cell and the switch actuating means is a solenoid-operated hydraulic piston.

References Cited in the file of this patent

UNITED STATES PATENTS

| | | |
|---|---|---|
| 2,081,900 | Brown et al. | June 1, 1937 |
| 2,206,550 | Mordin | July 2, 1940 |

FOREIGN PATENTS

| | | |
|---|---|---|
| 609,731 | Germany | Mar. 8, 1935 |